March 18, 1952 J. A. SHELBY 2,590,070

MONORAIL CARRIER SWITCH SAFETY MECHANISM

Filed Sept. 30, 1948 7 Sheets-Sheet 1

INVENTOR.
John A. Shelby
BY Paul O. Pippel
Atty.

March 18, 1952 J. A. SHELBY 2,590,070

MONORAIL CARRIER SWITCH SAFETY MECHANISM

Filed Sept. 30, 1948 7 Sheets-Sheet 2

INVENTOR.
John A. Shelby
BY Paul O. Pippel
Atty.

March 18, 1952 J. A. SHELBY 2,590,070

MONORAIL CARRIER SWITCH SAFETY MECHANISM

Filed Sept. 30, 1948 7 Sheets-Sheet 3

INVENTOR.
John A. Shelby
BY Paul O. Pippel
Atty.

INVENTOR.
John A. Shelby
BY Paul O. Pippel
Atty.

MONORAIL CARRIER SWITCH SAFETY MECHANISM

Filed Sept. 30, 1948 7 Sheets-Sheet 5

INVENTOR.
John A. Shelby
BY Paul O. Pippel
Atty.

March 18, 1952 J. A. SHELBY 2,590,070

MONORAIL CARRIER SWITCH SAFETY MECHANISM

Filed Sept. 30, 1948 7 Sheets-Sheet 6

INVENTOR.
John A. Shelby
BY Paul O. Pippel
Atty.

March 18, 1952 J. A. SHELBY 2,590,070

MONORAIL CARRIER SWITCH SAFETY MECHANISM

Filed Sept. 30, 1948 7 Sheets-Sheet 7

INVENTOR.

John A. Shelby

BY Paul O. Pippel

Atty.

Patented Mar. 18, 1952

2,590,070

UNITED STATES PATENT OFFICE 2,590,070

MONORAIL CARRIER SWITCH SAFETY MECHANISM

John A. Shelby, Indianapolis, Ind.

Application September 30, 1948, Serial No. 51,950

4 Claims. (Cl. 104—103)

This invention relates to a switch arrangement for a rail carrier system. More particularly the invention relates to a monorail tongue-type of switch for switching carriers to and from a main track, the switch including a novel safety mechanism.

In monorail type carrier systems a main track generally is arranged to be placed into connection with a plurality of branch or spur tracks for switching and diverting carriers to different points in the system. The monorail type of arrangement has been exceptionally well adapted to foundry plants where it is desired to have the carrier positioned overhead. In this type of system, sections of monorail track extend overhead above the foundry operations and a hot metal carrier is operated along the monorail track. The hot metal carrier generally consists of a cab that is mounted on and carried by a frame. The frame also carries a tank which normally carries the hot metal from the furnace to the place where the pouring of the metal is done. A workman or operator is enclosed within the cab and it is his function to operate the carrier to and from the various destinations within the foundry plant. The operator has complete control of the movement of the carrier and freely operates the same over the various main and spur tracks to the place where the hot metal is to be poured. In a large foundry, numerous of these carriers may be utilized and in each case the individual operator has control of his carrier and the switches which he encounters. Since the operator has complete control of the switching, it is exceptionally important that he is at all times aware of the position of the switch so that his or other carriers do not run off the end of an open track section. When a number of carriers are utilized in a plant it is readily apparent that considerable danger exists unless some positive block system is provided for stopping the carriers from running off of the open tracks. The result of such a failure of operation is, of course, obvious, and the great injury that might be occasioned makes it necessary to provide a block system for the end of the open tracks.

In the past a number of safety mechanisms have been provided by the utilization of mechanical blocking mechanisms. One safety mechanism that has previously been used is a mechanism that incorporates a metal plate or block that is moved over the end of an open track. The block or plate is moved by means of a mechanical linkage which, in turn, is actuated by the switch when the switch is moved; thus, when a switch is moved from one branch to another branch, the open branch has a mechanical block at one end to prevent the carriers from leaving the track. In this type of arrangement the switch is generally manually shifted horizontally by the operator in the cab adjusting the brake in the track. The operator, through a cable and blocking means, would manually shift the switch and an adjustable linkage between the switch and block would thereupon drop the block over the end of the open track. This type and other similar arrangements have been utilized. In each instance, however, the linkage mechanism would be connected to the track and actuated by the switching mechanism. There are many inherent problems with this type of mechanism and the safety factor would be greatly lowered since the mechanism could not be considered as being positive in operation at all times and under any circumstances. Frequent adjustment and maintenance of the linkages would have to take place and in some instances the wear on the linkage and block arrangement would cause malfunction, resulting, at times, in injury to the operator and endangering the lives of the workers under the monorail carrier systems. It can be readily appreciated that when a number of moving parts and linkages have been used over a great period of time, the resulting wear tends to create a mechanism that is not positive and generally results in loose and haphazard operation. It is applicant's prime object, therefore, to provide an improved and novel monorail switch having a positive safety means for blocking any tracks that may be left open during the switching operating of the switch.

Another important object is to provide a mechanical safety block for a switching mechanism adapted to divert carriers from a main track to a plurality of branch or spur tracks.

Another object is to provide a positive safety block for a monorail carrier switch, said block being effective to block the open tracks of a switching system during movement of the switch.

Still another object is to provide a positive baffle carried on and movable with a monorail switch, said baffle being arranged to block one branch track when the switch is moved to connect with another section of branch track.

A still further object is to provide a positive block arrangement carried by a monorail carrier switch, said block arrangement being adapted to positively block any open tracks during the switching movement of the switch.

A still further object is to provide a sector-shaped tongue-type monorail carrier switch, said switch having a relatively short track section adapted to be placed in connection with a plurality of branch tracks and a bumper between the branch tracks adapted to positively and effectively block the open end of the track section moving with the metal carrier switch.

A still further object is to provide a sector-shaped monorail switch frame, said frame having mounted thereon an arcuate baffle for blocking the adjacent open sections of track which are served by the switch.

These and other objects will become more clearly apparent upon a reading of the specification when examined in connection with the drawings.

Figure 1:
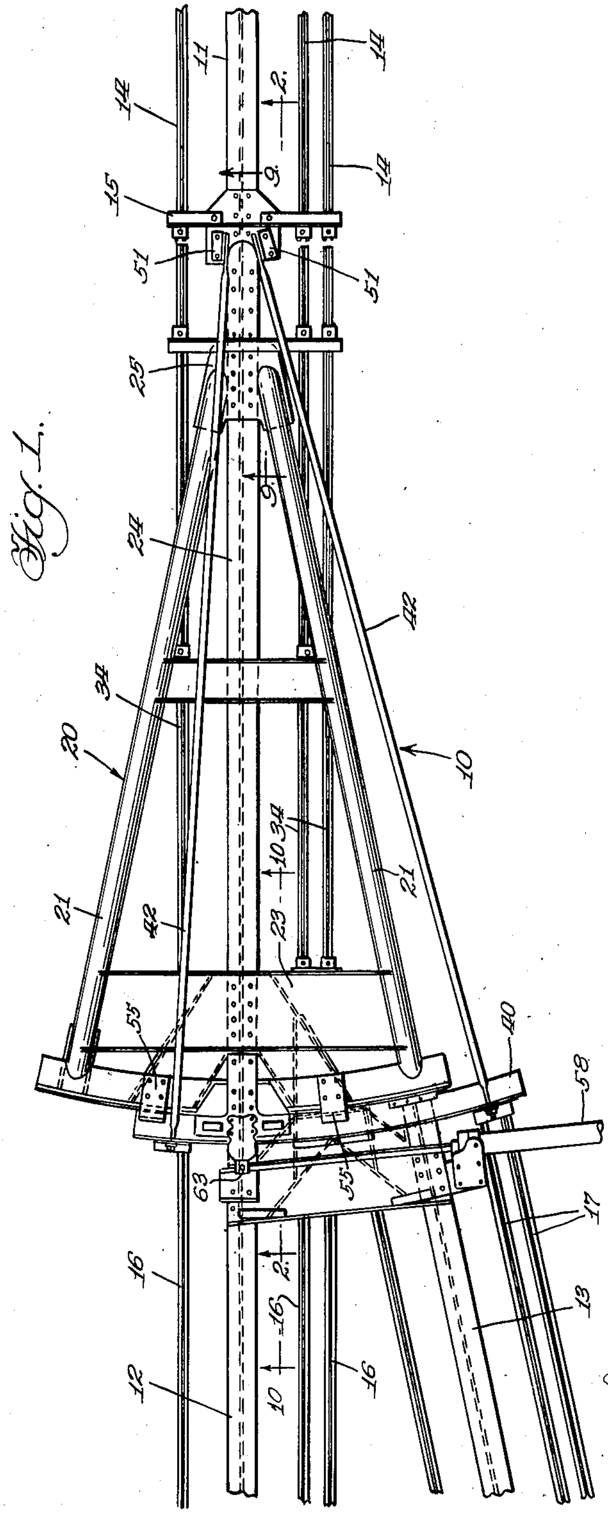
Fig. 1 is a plan view of a switch mechanism showing a main track and adjacent branch tracks served by the switch.
Figure 2:
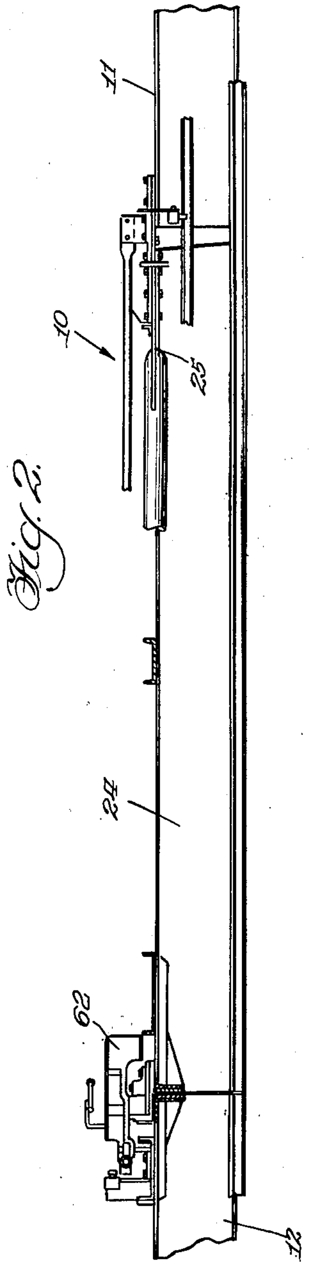
Fig. 2 is a sectional view substantially taken along the line of 2—2 of Fig. 1.
Figure 4:
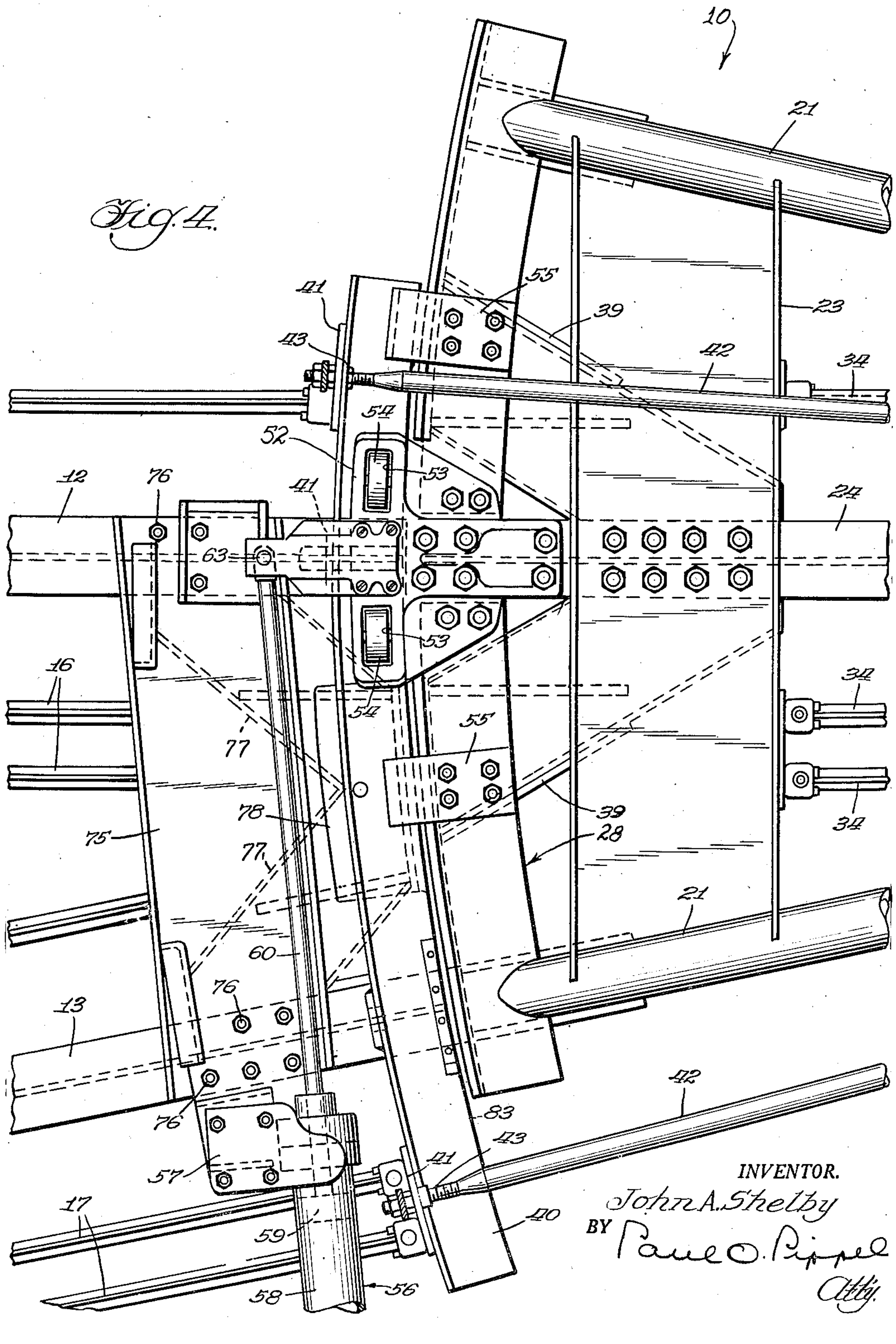
Fig. 4 is a plan view showing a switching mechanism and track connections in an enlarged showing.

Referring particularly to Figs. 1, 2 and 4, a monorail switching arrangement is generally designated by the reference character 10. The monorail switching arrangement shown includes a main track 11. The main track 11 is adapted to be placed into connection with branch or spur tracks 12 and 13. For the purpose of description, the terms "main track" and "branch tracks" are utilized, it being understood that a monorail arrangement of tracks is intended wherein carriers are to be diverted from one track to another. The main and branch tracks are generally made of I-beams which are suitably supported from the roof of a plant not shown. The main track has positioned on each side conductor rails 14, which are supported on transverse supports 15. Likewise, the branch tracks 12 and 13 are respectively provided with conductor rails 16 and 17 for carrying the electrical current supply to the metal carriers, as will become more apparent later.

Figures 7, 8:
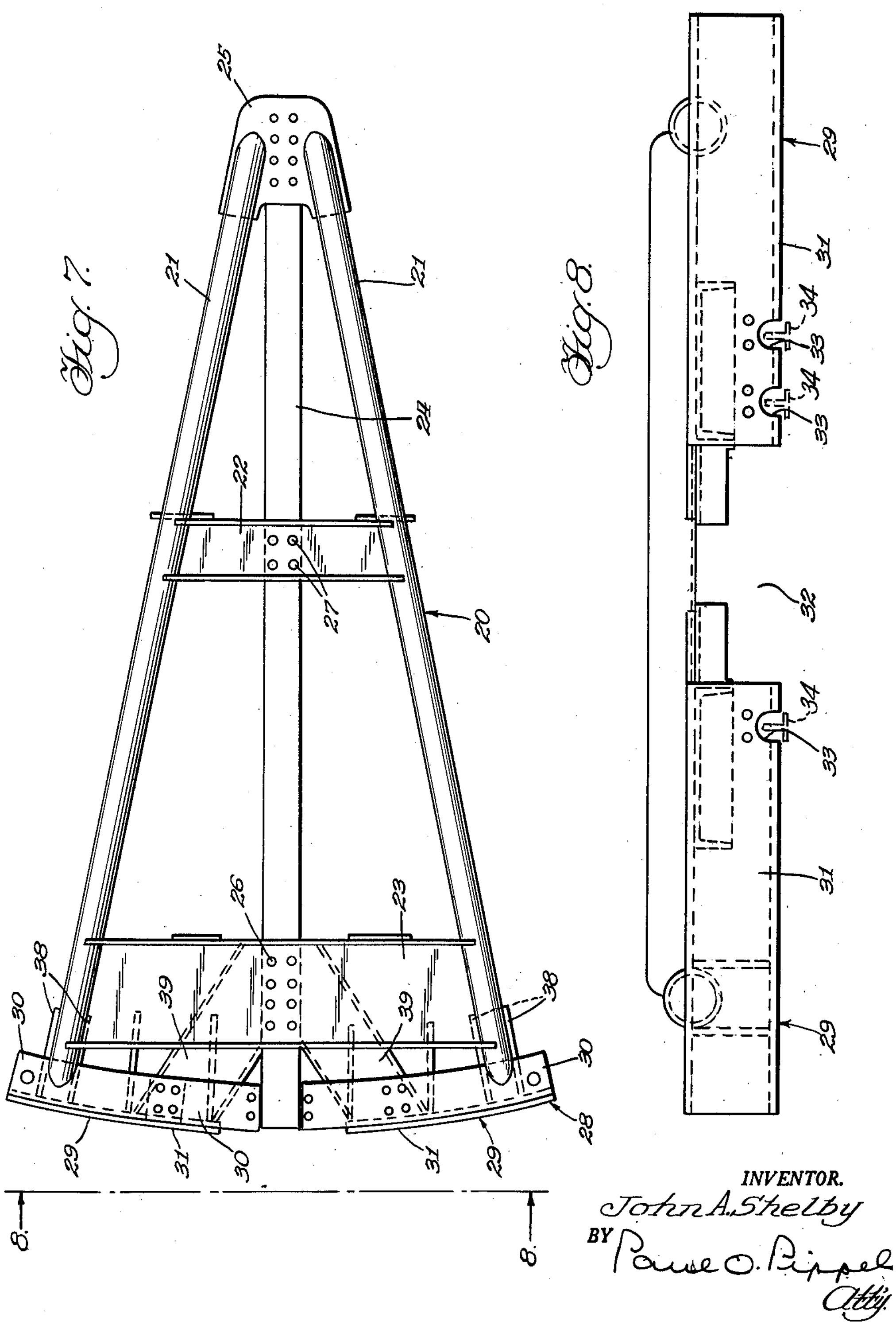
Fig. 7 is a sector-shaped tongue frame utilized with a switching mechanism.
Fig. 8 is a sectional view along the line 8—8 of Fig. 7.

A switching mechanism or switching frame is generally designated by the reference character 20. The frame 20 has a pair of diverging tubular brace or supporting members 21. The brace members are rigidly secured in diverging relation by means of transverse channels 22 and 23. A short section of track 24 is rigidly positioned and carried between the brace members 21, the track section 24 being arranged to be placed into connecting engagement with either the branch tracks 12 or 13. As best shown in Fig. 1, the short track section 24 is at all times in connecting engagement with the main track 11. The brace members 21 extend rearwardly for connection to a connecting plate 25. The short track section 24 is connected to the frame by means of bolts 26 and 27 as best indicated in Fig. 7. The tongue frame 20 is sector-shaped and has connected at one end a baffle or bumper generally designated by the reference character 28, as best shown in Figs. 4 and 7. The baffle or bumper comprises a pair of arcuate segments 29 which consist of angle-shaped members 30. A cross-section of the angle members 30 can best be seen in Fig. 10. An arcuate reinforcing plate 31 is connected to each of the angle members 30. As best shown in Figs. 7 and 8, the baffle 28 is provided with a centrally located opening 32 through which one end of the short track section 24 extends. The baffle 30 is also provided with spaced apertures 33 through which conductor rails 34 extend.

Figure 9:
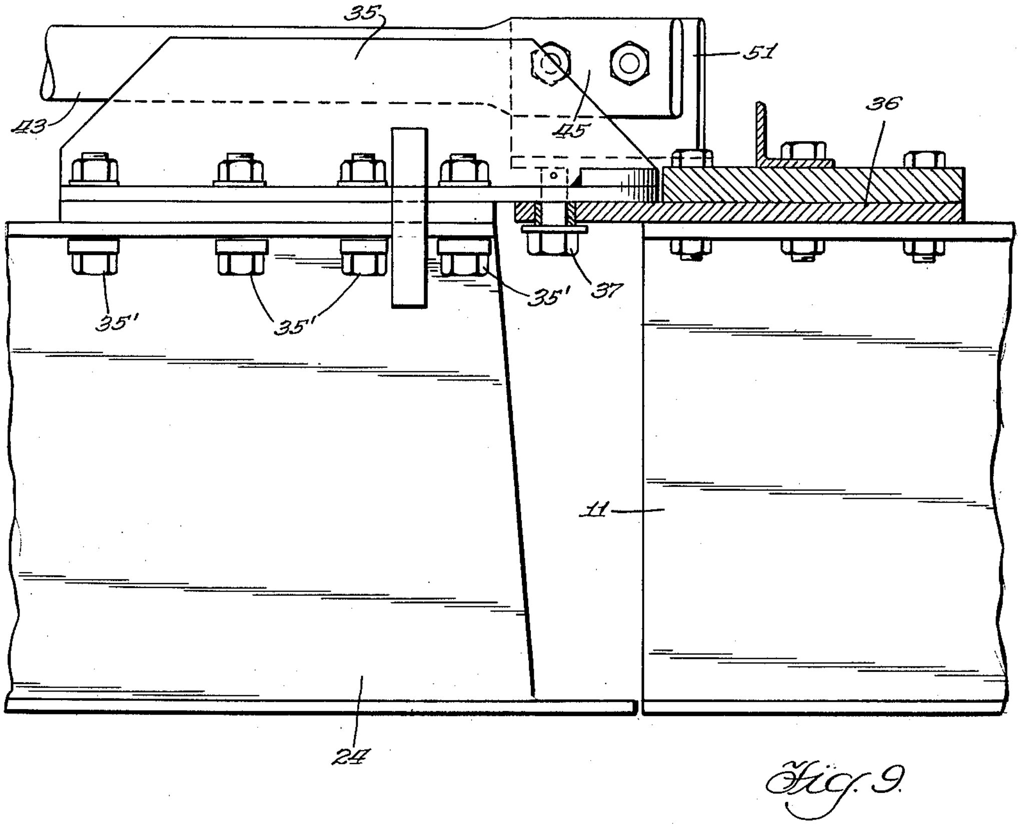
Fig. 9 is a sectional view showing a pivot arrangement for a switch and frame, said section being taken along the line 9—9 of Fig. 1.

The rearmost portion of the frame 20 is provided with a pivot plate or support arm 35, as best shown in Fig. 9. The pivot plate 35 is rigidly secured to one end of the short track section 24 by means of a plurality of bolts 35′. A support frame or plate 36 is also rigidly secured to one end of the main track section 11 and the support plate is provided with an opening 36′ through which a pivot pin 37 projects. The pivot pin 37 projects upwardly into the pivot plate 35 and provides for pivotal movement of the frame 20 with respect to the end of the main track 11.

As best shown in Fig. 7, the forward ends of the brace members 21 are rigidly secured to the baffle 28 by means of rearwardly extending plates 38 which may be secured to the brace members 21 by welding. A pair of gussets 39 are rigidly connected to the baffle 28 and extend rearwardly for rigid connection to the transversely extending member 23.

Figure 10:
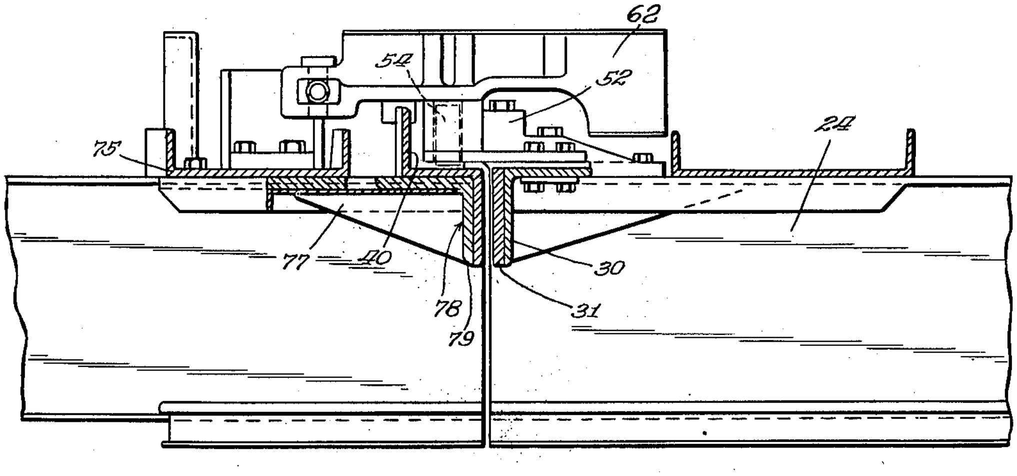
Fig. 10 is a sectional view through a switching frame showing its cooperation with branch tracks, said view being taken along the line 10—10 of Fig. 1.

A sector angle or guide member is best shown in Figs. 4 and 10. The sector angle is of arcuate shape and is secured to the top ends of the tracks 12 and 13. The sector angle 40 also includes upwardly extending plates 41 positioned at opposite ends of the sector angle. A pair of rearwardly extending links 42 are secured through the plates 41 as indicated at 43. The links 42 are connected sufficiently above the sector angle 40 so that the switch frame 20 may shift underneath with sufficient clearance. The links 42 extend rearwardly in diverging relation to a point, as indicated at 45, where they are connected to upwardly extending angles 51. The angles 51 are securely mounted on the support frame 36. By view of the connecting arrangement of the sector plate 40 to the tracks 12 and 13 and through the brace connection 42, a rigid positive structure is provided on which the switch frame 20 can be pivoted in a horizontal plane.

As best shown in Figs. 4 and 10, a roller support casting 52 is mounted centrally on the sector frame 20. The roller support casting 52 is provided with openings 53 within which rollers 54 are journalled. The rollers 54, as best shown in Fig. 4 or 10 are so positioned that they roll upon the horizontal surface of the sector angle 40; thus, as the frame 20 is moved in a horizontal plane about the pivotal connection on the pivot plate 35, the rollers move laterally on the sector angle 40, thereby in effect movably supporting one end of the sector frame. The arcuate segments 29 of the baffle 28 are also provided with spaced guide plates 55 which are positioned at opposite sides of the track section 24.

The sector frame 20 may be moved in a horizontal plane by means of an extensible power unit 56. The power unit 56 is securely mounted on the track 13 by means of a supporting bracket 57. The extensible power unit 56 is of a pressure type and consists of a cylinder 58 having a piston 59 arranged to reciprocate therein. The piston 59 is connected to a piston rod 60. The piston rod 60 extends outwardly of the cylinder 58 for connection to the connecting portion 61 of a lock housing 62. A lock pin 63 as best shown in Figs. 1 and 4 is adapted to pivotally connect the end of the piston rod 60 to the connecting portion 61. The lock housing 62 contains a releasable lock mechanism (not shown) for locking the sector frame 20 in its various positions.

As best shown in Figs. 4, 11, 12 and 13, a cross brace of channel construction 75 extends laterally between and connects the branch tracks 12 and 13. The tracks are securely connected to the cross brace 75 by means of bolts 76. A pair of gussets 77 are rigidly secured to the brace 75 and extend outwardly with respect thereto for connection to a bumper 78. As best shown in Fig. 10, the bumper 78 is of angle shape and includes a vertical edge 79. A bumper plate 80 is rigidly secured to the vertical edge 79.

Figure 3:
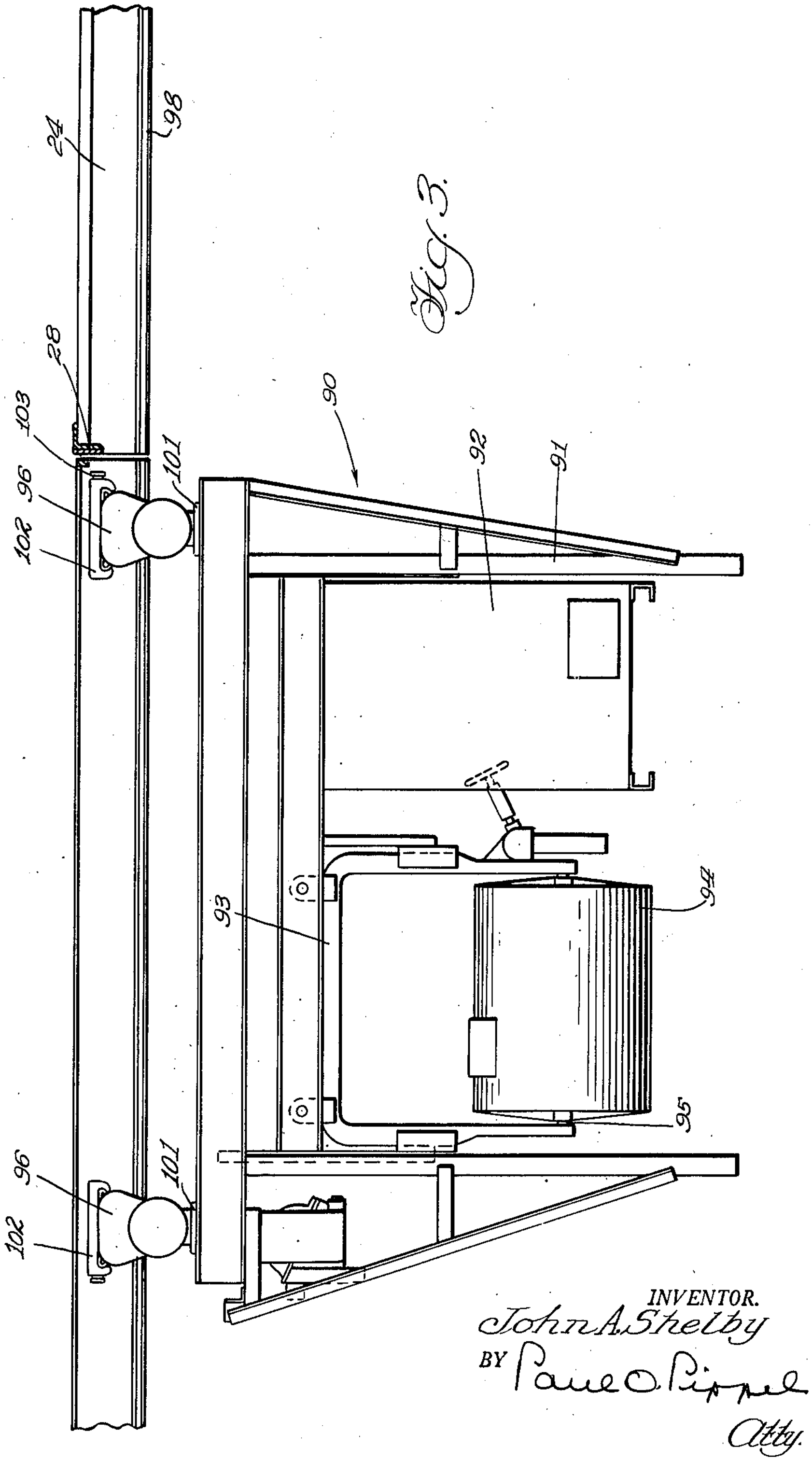
Fig. 3 is a side elevational view of a hot metal mobile carrier unit carried on a monorail track.

As best shown in Fig. 3, a hot metal monorail carrier is designated by the reference character 90. The monorail carrier includes a frame 91. The frame 91 has mounted thereon an operator's cab 92. The frame also includes a downwardly extending yoke 93 which has pivoted therebetween a tank 94 by means of a shaft 95. The tank 94 is adapted to be rotated by an operator enclosed within the cab 92 for pouring out the contents of the tank as desired.

Figure 5:
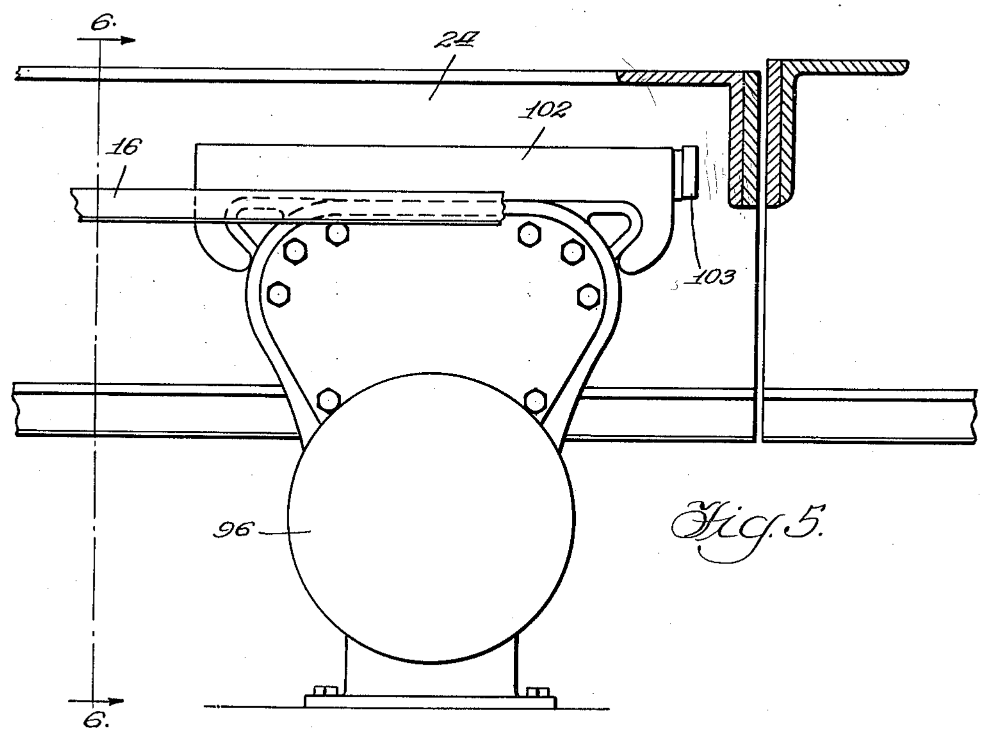
Fig. 5 is a detailed view of a roller structure for a metal carrier unit.
Figure 6:
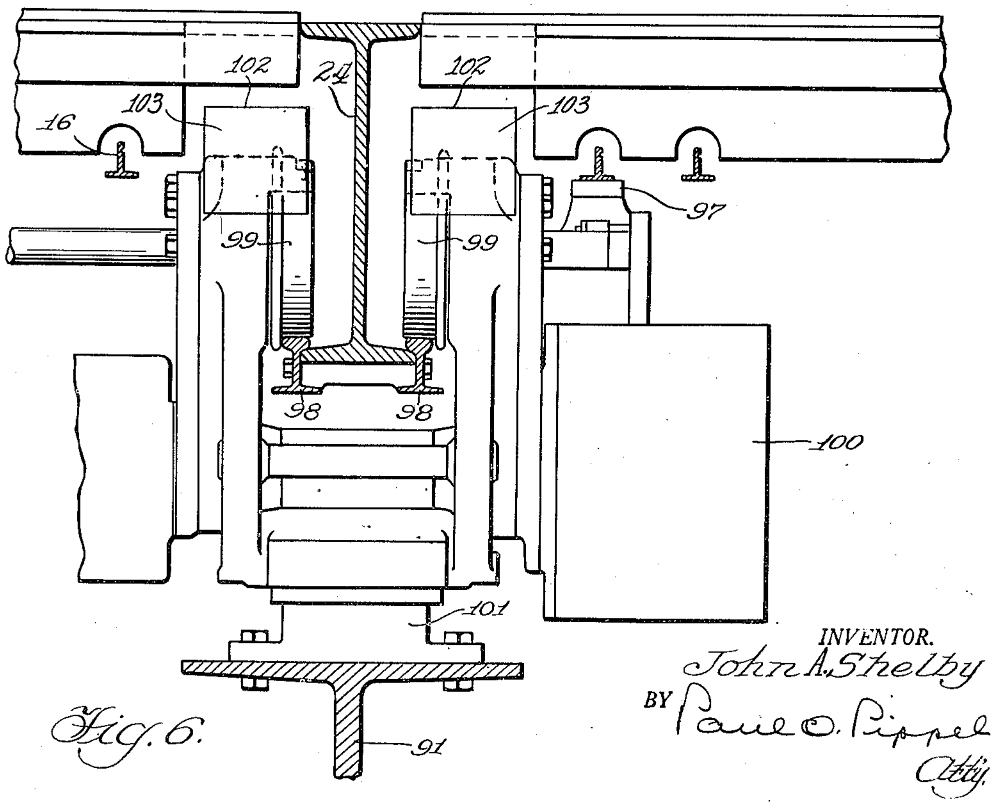
Fig. 6 is a sectional view along the line 6—6 of Fig. 5.

As best shown in Figs. 3, 5 and 6, a pair of roller supports 96 are connected to the frame 91 for moving the frame and the carrier. The roller supports include a trolley 97, as best shown in Fig. 6, for engaging the conductor rails of the system. The lower end of the short track section 24 is provided with track rails 98 on which the track rollers 99 are supported. It is to be understood that similar track rails 98 are connected to the main track 11 and spur or branch tracks 12 and 13. An electric drive unit 100 is positioned on one of the roller supports 96, as best shown in Fig. 6, for providing driving power to the track rollers 99. The roller supports 96 are also provided with connecting members 101 for connecting the supports to the frame 91. The upper ends of the roller supports 96 are provided with bumper structures 102 which are provided at one end with bumper pads 103, as best shown in Fig. 5.

Figure 11:
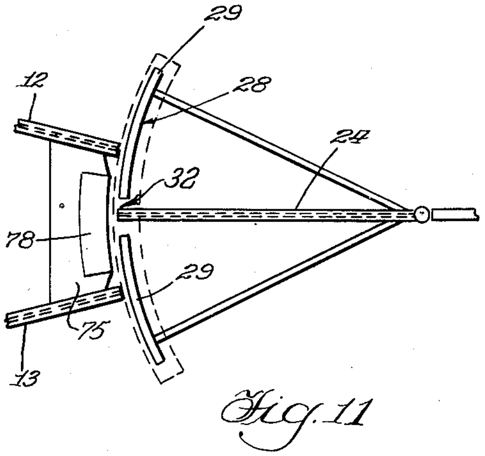
Fig. 11 is a schematic view of a switch mechanism showing the switch in a position between a pair of branch tracks.
Figure 12:
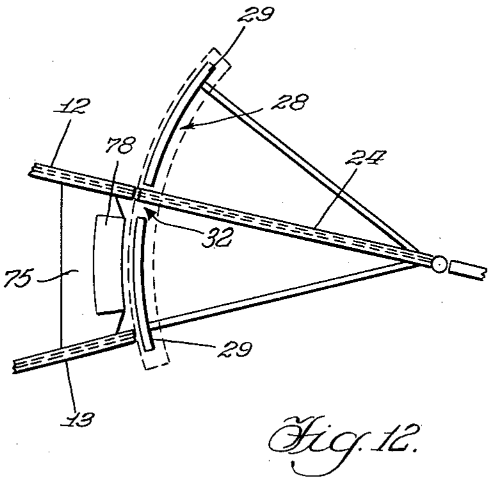
Fig. 12 is a diagrammatic view showing the switching mechanism having a track section in connection or communication with a branch track.
Figure 13:
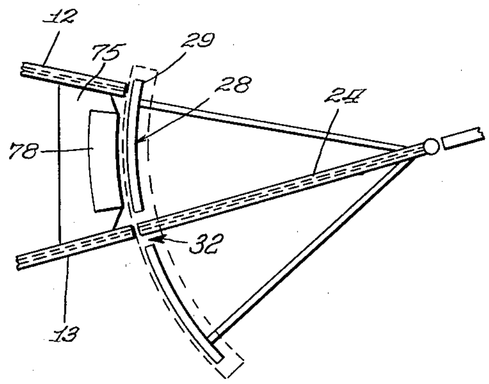
Fig. 13 is a diagrammatic switching arrangement in a position wherein the track section of the switch is in connecting engagement with a branch track.

During the operation of the switch it may be desired to move the switching frame 10 to the positions shown in Figs. 11, 12 and 13. In these figures the switch and the adjoining tracks are shown in diagrammatic form in order to better illustrate the invention. In Fig. 12 the main track 11 is in communication with the short track section 24. The short track section 24 is also in communication with a branch track 12. It must be understood that the branch track 12 can also be an extension or part of the main track 11. The terms "branched" or "spur" tracks are merely used for purposes of description. In this position any hot metal carrier can readily travel from the main track 11 to the branch track 12. It should be noted that the spur track 13 is completely closed at all times when the track section 24 is not in direct registering alinement with this track. The same is true for track 12 since the baffle 28 positively and completely blocks any open track. The space 32 of the baffle 28 is only of sufficient width to prevent the roller supports 96 and bumpers 102 to pass through this space when direct alinement of the tracks takes place. During any other time the baffle 28 and bumper 78 effectively block any open track. Therefore any carrier that might be running on track 13 toward the switch would become blocked by means of the segment 29. Should one of the operators, for some reason, fail to note the open end of track 13, he would not be able to run his carrier off the end of the track since the segment 28 is positively and effectively blocking the track. As best shown in Fig. 3, the baffle 28 would be in such a position that the bumper 103 would engage the baffle, and the travel of the carrier 90 would be stopped. In view of the novel structure of the switching tongue frame 20, the baffle 28 is positive and rigid, and therefore would absorb any impact load that might be directed against it by the carrier 90. Thus it can be seen that the segment 29 effectively blocks the track 13 while the short track section 24 is in communication with the branch track 12. The tongue frame is positively secured so that the short track section 24 may be placed in registering alinement with either of the tracks 12 or 13.

If it is desired to move the switching frame from the position shown in Fig. 12, the operator actuates the cylinder 56 whereupon the piston 59 reciprocates to move the frame 20 in a horizontal plane from the position shown in Fig. 12. As the frame 20 and track 24 move from the track 12, the arcuate segment 29, as best shown in Fig. 11, immediately moves over and covers the end of the track 12. Thus during the switch movement of the frame 20 the track 12 is at all times blocked and carriers moving on the track 12 would be unable to run off of the end of the track. During the movement of the frame 20 and the track section 24 it may be that a carrier is moved along the main track toward the switch frame 20. This carrier would be unable to drop from the end of the track since the end of the track 24 is positively blocked by the bumper 78, which is positioned between the tracks 12 and 13. Immediately after the end of the track 24 is placed out of registering alinement with the branch track 12, the bumper 78 is effective to block the open end of the track 24 and thus carriers moving to this track would also be blocked. As shown in Fig. 11, during movement of the switch 20 the branch track 13 is also effectively blocked since the arcuate segment 29 of the baffle 28 effectively blocks the end of this track.

When the switch has taken a position shown in Fig. 13 wherein the short track section 24 is in connection or registering alinement with branch track 13, the arcuate segment 29 of the baffle 28 effectively blocks the branch track 12. As best shown in Figs. 11, 12 and 13, the baffle 28 and bumper 78 are positioned so that a positive mechanical block is provided whenever an open track is present and whenever the switch is moved during the switching operation. Thus, in effect, the three open tracks may be present at one time during the switching arrangement and the three open tracks are positively and effectively blocked so that a carrier coming on any of these tracks could not drop from the ends of the tracks due to the operator's failure and lack of judgment. An effective mechanical block has, therefore, been provided which need not be actuated by linkage mechanisms that may need adjustment or replacement due to wear, etc. The baffle arrangement is such that in any case where an open track is present, an effective mechanical block is provided. Mechanical failure of the baffle arrangement is very improbable in view of the positive mechanism involved.

It can now be seen that an effective safety arrangement and mechanical block system has been provided for positively blocking the open end of the tracks used in connection with a monorail switching mechanism. In a monorail system of the type above disclosed wherein the operator on the individual carrier units has complete control of the switching, it is imperative that the most rigorous safety arrangement be utilized. By the utilization of the novel baffle arrangement a block system has been provided that is effective regardless of the judgment of the operator, and despite failures that may occur in the electrical block system which may be utilized. In all switching arrangements of this type an electrical block system is also utilized but it can be seen that the only positive effective measures would be in the utilization of a positive mechanical block. This problem has been effectively solved by the novel construction disclosed. It is to be understood that the arrangement may be utilized in any carrier railway system where similar problems are encountered. It must be understood, however, that modifications and changes may be made which do not depart from the spirit of the invention nor the scope thereof as defined in the appended claims.

What is claimed is:

1. In a switch arrangement for a rail carrier system including a main track and first and second branch tracks; a switch mechanism for switching said first and second tracks into connection with said main track comprising a frame mounted for swinging movement in a horizontal plane; a short track section positioned on said frame, said section being in communication with said main track and having one end movable for connection with said branch tracks, a baffle means connected to said frame adjacent one end of said track section, said baffle having a surface adapted to be moved in a horizontal arcuate path over the ends of said branch tracks, said baffle being constructed and arranged to block one of said branch tracks when said track section is in communication with the other and to completely block the ends of both branch tracks when the short track section is moved; and baffle means positioned between the ends of the branch tracks for blocking the end of said track section in a position between said branch tracks.

2. In a switch arrangement for a rail carrier system including a main track and first and second branch tracks; a switch mechanism for switching said first and second tracks in connection with said main track comprising a frame mounted for swinging movement in a horizontal plane; a track section supported on said frame, said track section having one end in connection with said main track and another open end adapted to be swung into connection with said branch tracks, and a stationary baffle positioned between and adjacent the ends of said branch tracks, said baffle being arranged and constructed to block the open end of said track section during any position of the same between said branch tracks.

3. In a switch arrangement for a rail carrier system including a main track and first and second branch tracks; a switch mechanism for switching first and second tracks in connection with said main track comprising a tongue frame; a short track section supported on said frame, a support adjacent the ends of said main track, means pivotally connecting said frame to said support whereby said frame may be shifted in a horizontal plane, one end of said track section being in communication with said main track and the other end being adapted to be swung into connection with said branch tracks; an arcuate baffle member extending laterally outwardly at each side of said track section, said baffle member having a vertical face adapted to be moved horizontally across the ends of the branch tracks; means connected to said frame for moving the same; said arcuate baffle being arranged and constructed to block one end of said branch track when said track section is in communication with the other and to block the ends of both branch tracks when the short track section is moved, and a bumper element between said branch tracks, said bumper element being arranged to block an open end of said track section when said end is moved out of connecting relation with either of said branch tracks.

4. In a switch arrangement for a rail carrier including a main track and first and second branch tracks; a switch mechanism for switching said first and second tracks into communication with said main track comprising a frame mounted for swinging movement in a horizontal plane, said frame including a short track section having a first end in registry with the main track and a second end adapted to be moved to register with either of said branch tracks, baffle means connected to the frame adjacent the second end of said track section, said baffle means including vertical arcuate portions lying in the horizontal plane of the branch tracks, said portions extending outwardly at opposite sides of the second end of the track section, the innermost ends of said portions being slightly laterally spaced from the second end of said track section, and means for shifting said frame, said vertical arcuate portions being constructed and arranged to completely block both of the branch tracks during any swinging movement of the frame when said short track section is moved out of registry with either of said branch tracks to any position between said tracks, and a stationary bumper connected between said branch tracks for blocking the second end of said track section during said swinging movement of the same.

JOHN A. SHELBY.

REFERENCES CITED

The following references are of record in the file of this patent:

UNITED STATES PATENTS

| Number | Name | Date |
|---|---|---|
| Re. 17,830 | Wehr | Oct. 14, 1930 |
| 754,396 | Steedman | Mar. 8, 1904 |
| 836,042 | Johnston | Nov. 13, 1906 |
| 931,208 | Krieger | Aug. 17, 1909 |
| 1,178,470 | James | Apr. 4, 1916 |
| 1,447,167 | Bee et al. | Mar. 6, 1923 |
| 1,487,244 | Krump | Mar. 18, 1924 |
| 1,701,310 | Saborsky | Feb. 5, 1929 |